2,897,156

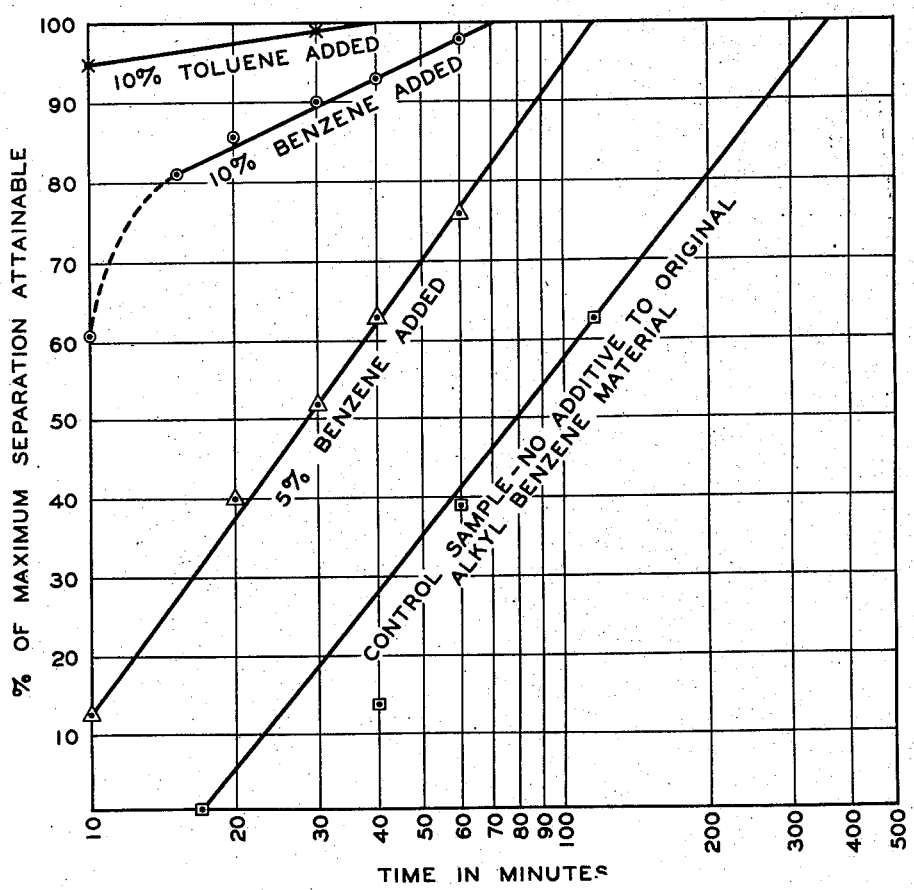

MANUFACTURE OF ALKYL BENZENE SULFONATE DETERGENTS

Allen H. Lewis, Berkeley, Calif., assignor to California Research Corporation, San Francisco, Calif., a corporation of Delaware Application September 14, 1951, Serial No. 246,701

6 Claims. (Cl. 252—161)

This invention relates to an improvement in the process of manufacturing alkyl aryl sulfonate type detergents and, more particularly, to the manufacture of those alkyl aryl sulfonate detergents, the alkyl group of which contains from nine to eighteen carbon atoms.

In the commercial manufacture of detergents of this type it is a usual practice to sulfonate an alkyl aryl hydrocarbon material, such as, for example, a polypropylene benzene having from 12 to 15 carbon atoms in the polypropylene radical, preferably with fuming sulfuric acid. The molar ratio of the fuming sulfuric acid to the hydrocarbon may vary from about 2.5 to about 4. The temperature during the addition of sulfuric acid to the hydrocarbon material may be controlled within the range from about 80° to about 100° F. After this addition is completed, the temperature may be raised to about 130° F. for about three hours to assure completion of the sulfonation reaction.

By neutralizing the acid mixture resulting from this sulfonation with an appropriate base, such as concentrated sodium hydroxide, a mixture of sodium alkyl aryl sulfonate and inorganic sodium sulfate is obtained. The ratio of these two compounds in the aqueous neutralization product mixture or slurry depends upon the amount and strength of sulfuric acid used for the sulfonation. For example, if the molar ratio of acid to hydrocarbon is 2.6, and the strength of the acid is about 22% fuming (22% $SO_3$), then the neutralized product on a dry basis will contain about 60% by weight of sodium alkyl aryl sulfonate and 40% by weight of sodium sulfate.

This 60:40 weight ratio of sulfonate to sulfate makes such a product suitable as a detergent in a number of industrial applications and also for blending with builders and extenders in the manufacture of household washing compositions. However, for some uses, and especially for the formulation of some household washing compositions, it is desirable to obtain a product with a higher ratio of sodium alkyl aryl sulfonate to sodium sulfate to permit the incorporation of larger percentages of builders and, consequently, to secure better efficiency thereof as a detergent. The higher ratio also permits the formulation of liquid type products and bar type products, both of which are very difficult to formulate with the lower ratios of sulfonate to sulfate.

The technique which has been used to obtain this higher ratio of sulfonate to sulfate involves adding about 10 parts by weight of water to about 90 parts by weight of the sulfonation mixture after completion of the reaction, and allowing the two phases which form upon addition of water to separate. The bottom phase consists essentially of sulfuric acid containing only a small amount of sulfonic acid, and the top phase contains the bulk of the sulfonic acid with some sulfuric acid. After withdrawal of the separated bottom layer and neutralization of the top layer, an aqueous mixture or slurry is formed which on the dry basis contains about 85% sodium alkyl aryl sulfonate and 15% sodium sulfate.

However, this procedure has several serious disadvantages. These result from the fact that the separation of the layers is very slow. It is necessary to let the sulfonic-sulfuric acid mixture settle from 16 to as long as 24 hours, and to keep it warm during this time, preferably from about 150° to about 160° F. Not only is this uneconomical from the point of view of equipment, time consumed and heat required, but it also results in a deterioration in the color and odor of the ultimate alkyl aryl sulfonate detergent products. Once the sulfonation mixture has been neutralized, the resulting sulfonates are stable chemically, but if the sulfonic acids in the sulfonation reaction mixture are allowed to remain in close contact with the excess of unreacted sulfuric acid for extended periods of time and particularly at elevated temperatures prior to the neutralization, they darken in color and develop unpleasant odors, which circumstance renders their corresponding sulfonates less desirable for use as detergents in household washing compositions. This deterioration in quality is an important factor in limiting their usefulness in just those types of products which require the higher ratios of sulfonate to sulfate, namely, liquid-type detergents and bar-type detergents, for in these products color and odor are particularly noticeable and objectionable.

I have found that the separation of the sulfuric and sulfonic acid phases of these sulfonation mixtures after the addition of a suitable quantity of water can be greatly accelerated by the addition of either benzene sulfonic acid or toluene sulfonic acid to such mixtures. When this is done, either by the direct addition of these acids to the sulfonation reaction, or to the water about to be used for securing phase separation, or by their formation by simultaneous sulfonation of the corresponding parent hydrocarbons, i.e., benzene or toluene, in mixture with the alkyl aryl hydrocarbon stock, the separation can be effected in about 1 to 2 hours instead of 16 to 20 hours. This, therefore, results in considerable economy with respect to the time consumed in the commercial operation, and also yields a product substantially improved with respect to color and odor.

I have found that the phase separation is particularly effective and that the quality (odor and color) of the final detergent sulfonate products is improved when the content of benzene or toluene in the alkyl benzene mixture about to be sulfonated, or present as benzene sulfonic acid or toluene sulfonic acid in the alkyl benzene sulfonic acid mixture after the sulfonation of the alkyl benzene stock, is equal from at least about 5.0 to about 10.0% by weight.

This improvement in the processing of alkyl benzene sulfonic acid secured in accordance with my invention is illustrated by the following specific examples:

Example 1

270 parts of an alkyl benzene derived by alkylation of benzene with polypropylene containing from 12 to 15 carbon atoms in the polypropylene chain and 30 parts of benzene were stirred together in a reactor equipped with a heat exchanger. 373 parts of 20% fuming sulfuric acid were added slowly over a period of 45 minutes, while the temperature was maintained between 85° and 90° F. When the addition of the acid was complete, the temperature was raised to 115° F., and stirring was continued for 3 hours. At the end of the digestion period, 76 parts of water were added and stirring continued for five minutes more. The dilution of the excess sulfuric acid with water caused a temperature rise to about 160°-175° F. At this point, stirring was stopped, and the reaction mixture was allowed to separate into two phases. No further heat addition was necessary to insure this separation, nor was any special heat insulation required to maintain the temperature.

In this example 98% of the maximum attainable separation occurred in one hour. In contrast thereto, identical alkyl benzene which was sulfonated and diluted in the above described manner, but which did not receive an addition of from 5.0 to 10.0% by weight of benzene or toluene in accordance with the present invention, separated to the extent of only 47% after one hour.

*Example 2*

270 parts of an alkyl benzene of the same kind as in Example 1 and 30 parts of toluene were sulfonated as described hereinabove with 357 parts of 20% fuming sulfuric acid. After digestion, the reaction mix was diluted with 74 parts of water and allowed to settle.

In this case 99.5% of the maximum attainable separation occurred in 30 minutes.

*Example 3*

285 parts of an alkyl benzene of the same kind as in Example 1 and 15 parts of benzene were sulfonated as above described with 331 parts of 20% fuming sulfuric acid. After digestion, the reaction mixture was diluted with 72 parts of water and allowed to settle in the above described manner.

In this example 76% of the maximum attainable separation occurred in one hour.

The attached drawing serves to illustrate the improvement secured with respect to the rate of separation of sulfuric acid from the water-diluted sulfonic-sulfuric acid mixtures obtained in accordance with my invention. The curves shown in this drawing were obtained after adding benzene and toluene to mixtures of $C_{12}$ to $C_{15}$ polypropylene benzenes, which were produced by alkylating benzene with a typical alkyl benzene stock for detergent production, namely, $C_{12}$–$C_{15}$ propylene polymer in the presence of a hydrofluoric acid catalyst, sulfonating, and diluting with water as described in the examples.

These curves unmistakably show that additions of from at least 5.0 to 10.0% by weight of benzene or toluene effect a remarkable and unexpected reduction in the time required for attaining the desirable substantially complete separation of sulfonic acid from sulfuric acid to a period from about one to about two hours. Depending on the size of the settling vessels employed, the time of separation can be conceivably made even shorter.

It is to be understood that my invention is not limited by the above illustrative examples of sulfonic-sulfuric acid separation and that only such limitations should be imposed thereon as are defined in the appended claims.

I claim:

1. In the process of manufacturing alkyl aryl sulfonate detergents by sulfonating $C_9$ to $C_{18}$ monoalkyl benzenes, adding water to the sulfonation reaction product mixture, settling the resulting mixture to separate a sulfonic acid phase and a sulfuric acid phase, and neutralizing the sulfonic acid phase with sodium hydroxide, the method of substantially reducing the time required to effect said phase separation which comprises adding to said alkyl benzenes from at least 5 to 10% by weight, based thereon, of an aromatic hydrocarbon material from the group consisting of benzene and toluene prior to said sulfonation.

2. In the process of manufacturing alkyl aryl sulfonate detergents by sulfonating $C_9$ to $C_{18}$ monoalkyl benzenes, adding about 10 parts by weight of water to each 90 parts by weight of the sulfonation reaction product mixture, settling the resulting mixture to separate a sulfonic acid phase and a sulfuric acid phase, and neutralizing the sulfonic acid phase with sodium hydroxide, the method of substantially reducing the time required to effect said phase separation which comprises adding to said alkyl benzenes from at least 5 to 10% by weight, based thereon, of an aromatic hydrocarbon material from the group consisting of benzene and toluene prior to said sulfonation.

3. In the process of manufacturing alkyl aryl sulfonate detergents by sulfonating $C_{12}$ to $C_{15}$ monoalkyl benzenes with a molar excess of fuming sulfuric acid, adding water to the sulfonation reaction product mixture, settling the resulting mixture to separate a sulfonic acid phase and a sulfuric acid phase, and neutralizing the sulfonic acid phase with sodium hydroxide, the method of substantially reducing the time required to effect said phase separation which comprises adding to said alkyl benzenes from at least 5 to 10% by weight, based thereon, of an aromatic hydrocarbon material from the group consisting of benzene and toluene prior to said sulfonation.

4. In the process of manufacturing alkyl aryl sulfonate detergents by sulfonating $C_9$ to $C_{18}$ monoalkyl benzenes, adding water to the sulfonation reaction product mixture, settling the resulting mixture to separate a sulfonic acid phase and a sulfuric acid phase, and neutralizing the sulfonic acid phase with sodium hydroxide, the method which comprises adding to said alkyl benzenes from at least 5 to 10% by weight, based thereon, of benzene prior to the sulfonation.

5. In the process of manufacturing alkyl aryl sulfonate detergents by sulfonating $C_9$ to $C_{18}$ monoalkyl benzenes, adding water to the sulfonation reaction product mixture, settling the resulting mixture to separate a sulfonic acid phase and a sulfuric acid phase, and neutralizing the sulfonic acid phase with sodium hydroxide, the method which comprises adding to said alkyl benzenes from at least 5 to about 10% by weight, based thereon, of toluene prior to the sulfonation.

6. A process of manufacturing alkyl aryl sulfonate compositions which comprises sulfonating a mixture consisting of alkyl benzene having from about 12 to 15 carbon atoms in the alkyl group and from about 5 to 10% by weight of an aromatic hydrocarbon compound taken from the group consisting of benzene and toluene, adding water to the sulfonated mixture, separating and neutralizing the sulfonic acid layer with sodium hydroxide.

References Cited in the file of this patent

UNITED STATES PATENTS

| | | |
|---|---|---|
| 2,456,119 | Friedman et al. | Dec. 14, 1948 |
| 2,615,847 | Thompson | Oct. 28, 1952 |